(12) United States Patent
Oeguen et al.

(10) Patent No.: US 12,436,093 B2
(45) Date of Patent: Oct. 7, 2025

(54) SPECTRAL SENSING DEVICE AND METHOD FOR MEASURING OPTICAL RADIATION

(71) Applicant: trinamiX GmbH, Ludwigshafen (DE)

(72) Inventors: Celal Mohan Oeguen, Ludwigshafen (DE); Sourabh Kulkarni, Ludwigshafen (DE); Florian Proell, Ludwigshafen (DE)

(73) Assignee: TRINAMIX GMBH, Ludwigshafen (DE)

( * ) Notice: Subject to any disclaimer, the term of this patent is extended or adjusted under 35 U.S.C. 154(b) by 125 days.

(21) Appl. No.: 18/253,705

(22) PCT Filed: Dec. 1, 2021

(86) PCT No.: PCT/EP2021/083695
§ 371 (c)(1),
(2) Date: May 19, 2023

(87) PCT Pub. No.: WO2022/117611
PCT Pub. Date: Jun. 9, 2022

(65) Prior Publication Data
US 2023/0417657 A1    Dec. 28, 2023

(30) Foreign Application Priority Data

Dec. 2, 2020 (EP) ..................................... 20211174

(51) Int. Cl.
*G01N 21/31* (2006.01)
(52) U.S. Cl.
CPC ....... *G01N 21/31* (2013.01); *G01N 2201/127* (2013.01)
(58) Field of Classification Search
CPC ...... G01N 21/31; G01N 21/35; G01N 21/274; G01N 2201/127; G01N 2201/0697;
(Continued)

(56) References Cited

U.S. PATENT DOCUMENTS

2002/0011567 A1* 1/2002 Ozanich ................ G01J 3/0224
                                                                  250/326
2013/0155401 A1    6/2013 Muto
(Continued)

FOREIGN PATENT DOCUMENTS

EP    3460509 A1    3/2019
WO    0169191 A1    9/2001
(Continued)

OTHER PUBLICATIONS

International Search Report and Written Opinion for corresponding PCT/EP2021/083695, mailed Mar. 14, 2022, 13 pages.

*Primary Examiner* — Tarifur R Chowdhury
*Assistant Examiner* — Carlos Perez-Guzman
(74) *Attorney, Agent, or Firm* — Armstrong Teasdale LLP

(57) ABSTRACT

Described herein is a spectral sensing device that includes at least one photosensitive detector, where the at least one photosensitive detector has at least one photosensitive region designated for receiving optical radiation, where at least one detector signal as generated by the at least one photosensitive detector is dependent on an illumination of the at least one photosensitive region; at least one radiation emitting element; at least one optical element; and at least one evaluation unit, where the at least one evaluation unit is configured to perform a calibration of the spectral sensing device by using at least one first detector signal as generated by the at least one photosensitive detector upon the illumination of the at least one photosensitive region by a first portion of the optical radiation. Also described herein is a method for measuring optical radiation with a spectral sensing device.

18 Claims, 4 Drawing Sheets

(58) Field of Classification Search
CPC .. G01J 3/021; G01J 3/28; G01J 3/4412; G01J 3/0256; G01J 3/42; G01J 3/0205; G01J 2003/4334
See application file for complete search history.

(56) References Cited

U.S. PATENT DOCUMENTS

| | | |
|---|---|---|
| 2014/0131578 A1 | 5/2014 | Hruska et al. |
| 2018/0128679 A1* | 5/2018 | Neitsch ................ G01J 3/0286 |
| 2020/0056939 A1* | 2/2020 | Ishizaki ................ G01J 3/0256 |

FOREIGN PATENT DOCUMENTS

| | | |
|---|---|---|
| WO | 2018115073 A1 | 6/2018 |
| WO | 2018203831 A1 | 11/2018 |
| WO | 2019115594 A2 | 6/2019 |
| WO | 2019115595 A1 | 6/2019 |
| WO | 2019115596 A1 | 6/2019 |
| WO | 2019215323 A1 | 11/2019 |
| WO | 2021110721 A1 | 6/2021 |

\* cited by examiner

SPECTRAL SENSING DEVICE AND METHOD FOR MEASURING OPTICAL RADIATION

CROSS-REFERENCE TO RELATED APPLICATIONS

This application is a U.S. National Phase Application of PCT/EP2021/083695, filed Dec. 1, 2021, which claims the benefit of priority to European Patent Application No. 20211174.6, filed Dec. 2, 2020, the entire contents of which are hereby incorporated by reference herein.

FIELD OF THE INVENTION

The invention relates to a spectral sensing device and a method for measuring optical radiation. Such devices and methods can, in general, be used for investigation or monitoring purposes, in particular in the infrared (IR) spectral region, especially in the near-infrared (NIR) spectral region, as well as for a detection of heat, flames, fire, or smoke. However, further kinds of applications are possible.

PRIOR ART

Known spectral sensing devices, such as spectrometer systems, which may, in particular, be used for diffused reflection spectroscopy, are, typically, calibrated with respect to a wavelength dependent sensitivity of at least one detector element as comprised by the spectral sensing device. Exemplary spectrometer systems are disclosed in US 2014/131578 A1, WO 2019/115594 A1, WO 2019/115595 A1, or WO 2019/115596 A1; however, further kinds spectral sensing device are also known.

In practice, a spectral sensing device may be subject to drifting effects which can, primarily, be caused by alterations that may be related to the spectral sensing device itself or that may have an effect onto the spectral sensing device. Specifically, the alterations may comprise at least one of a degradation of at least one of a radiation source or a detector element as comprised by the device; a temperature drift of at least one of the radiation source or the detector element; a variation of an ambient temperature affecting the device; a variation of a device temperature, i.e. the temperature at which the at least one detector and a corresponding electronics may operate; a mechanical extension or contraction of at least one component as comprised by the device, especially of at least one of a mechanical housing, a holder, or an optical element, in particular at least one of a dispersing element, such as a prism, a beam splitter, or a grating. However, further kinds of alterations are conceivable.

In practice, the drifting effects require to be corrected from time to time via a process, usually, denoted by the term "calibration", particularly in order to maintain a reliability of the measurement data, specifically by avoiding that the drifting effects may distort measurement data to such an extent that the results as determined by spectral sensing device may become inconclusive. For this purpose, a light calibration and a dark calibration can, preferably, be performed from time to time. Herein, different types of calibration measurements may be executed which, however, require a pre-defined reflection target or an empty volume in front of the at least one detector element, particularly in order to avoid that reflected radiation may reach the at least one detector element.

In particular, no calibration target is required in a "dark" measurement for the dark calibration to re-calibrate at last one of a dark current, a dark noise or a dark resistance. For the dark calibration, the at least one radiation source is, typically, turned off. In contrast hereto, a calibration target having a predefined reflection spectrum to guarantee a known and reproducible calibration signal, may for a "light" measurement, in particular for reflection spectroscopy, be positioned in a radiation path from the at least one radiation source to the at least one detector element in the same fashion as at least one measurement object as, typically, used for a spectral measurement, whereby, among others, the wavelength dependent sensitivity of the at least one detector element may be calibrated. For the calibration of the spectral sensing device, a user is, typically, responsible for positioning the calibration target and for removing any objects that may be placed in the sensing range of the sensing device.

WO 2018/203831 A1 discloses that calibrating a spectrometer module includes performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further includes storing in memory, coupled to the spectrometer module, a calibration record that incorporates the wavelength-versus-operating parameter calibration data, the optical crosstalk and dark noise calibration data, and the full system response calibration data, and applying the calibration record to measurements by the spectrometer module.

EP 3 460 509 A1 discloses a method for calibrating a time-of-flight system having a time-of-flight sensor located behind a cover plate (CP). The method involves emitting a plurality of sending pulses (EP) of light in response to respective trigger pulses of a control signal (CS1) and detecting received pulses of light (RP, RP'). Respective difference values are determined which are representative of a time period between one of the sending pulses (EP) and one of the received pulses (RP, RP'). The difference values are accumulated into a number of bins (1, ..., N) of at least one histogram. The method further involves recording at least one crosstalk response (CTP) in the histogram within a predetermined range of bins (1, ..., M), and calibrating the histogram using the recorded crosstalk response (CTP). Finally, an output signal (OS) is generated which is indicative of a time-of-flight based on an evaluation of the calibrated histogram.

WO 2019/215323 A1 discloses a spectrometer device (110). The spectrometer device (110) comprises: at least one filter element (114) adapted to separate at least one incident light beam into a spectrum of constituent wavelength; at least one sensor element (140) having a matrix of optical sensors (116, 142), the optical sensors (116, 142) each having a light-sensitive area, wherein each optical sensor (116, 142) is configured to generate at least one sensor signal in response to an illumination of the light-sensitive area by at least one light beam propagating from at least one object (112) to the spectrometer, wherein at least one first optical sensor of the optical sensors (116, 142) is adapted to generate a first sensor signal in response to illumination by a first constituent wavelength and wherein at least one second optical sensor of the optical sensors (116, 142) is adapted to generate a second sensor signal in response to an illumination by the first constituent wavelength; at least one evaluation device (120) configured for determining at least one longitudinal coordinate z of the object (112) by evaluating a combined signal Q from the first sensor signal and the second sensor signal, wherein the evaluation device (120) is configured for evaluating at least one sensor signal generated by the optical sensors (116, 142) of the matrix of optical sensor by performing at least one spectroscopic analysis considering the determined longitudinal coordinate z.

Despite the advantages as implied by the above-mentioned devices and methods, there still is a need for improvements with respect to a simple, cost-efficient and reliable optical detector which can be used, in particular within the infrared (IR) spectral range, for monitoring or investigation purposes, especially for spectroscopy, gas sensing, or concentration measurements. Specifically, drifting effects of the optical detectors, which often occur in practice during measurements, are still a problem. Further, users, specifically on the consumer level, often do not have the technical expertise for performing a proficient calibration on their own.

Problem Addressed by the Invention

Therefore, the problem addressed by the present invention is that of providing a spectral sensing device and a method for measuring optical radiation which at least substantially avoid the disadvantages of known devices and methods of this type.

In particular, it would be desirous to have a spectral sensing device which is configured to perform, preferably in a fully automatized fashion, a self-calibration of the spectral sensing device without requiring any predefined reflection target.

SUMMARY OF THE INVENTION

This problem is solved by the invention with the features of the independent patent claims. Advantageous developments of the invention, which can be implemented individually or in combination, are presented in the dependent claims and/or in the following specification and the detailed embodiments.

In a first aspect of the present invention, a spectral sensing device for measuring optical radiation is disclosed. Accordingly, the spectral sensing device comprises:
- at least one photosensitive detector, wherein the at least one photosensitive detector has at least one photosensitive region designated for receiving optical radiation, wherein at least one detector signal as generated by the at least one photosensitive detector is dependent on an illumination of the at least one photosensitive region;
- at least one radiation emitting element, wherein the at least one radiation emitting element is designated for emitting the optical radiation;
- at least one optical element, wherein the at least one optical element is designated to guide a first portion of the optical radiation to the at least one photosensitive detector;
- at least one evaluation unit, wherein the at least one evaluation unit is configured to perform a calibration of the spectral sensing device by using at least one first detector signal as generated by the at least one photosensitive detector upon the illumination of the at least one photosensitive region by the first portion of the optical radiation.

As used herein, the term "optical radiation", generally, refers to a partition of electromagnetic radiation which is, usually, referred to as "optical spectral range" and which comprises at least one of the visible, the ultraviolet, and the infrared spectral ranges. The term "ultraviolet", generally, refers to electromagnetic radiation having a wavelength of 1 nm to 380 nm, preferably of 100 nm to 380 nm. Further, the term "visible", generally, refers to a wavelength of 380 nm to 760 nm. Further, the term "infrared", "abbreviated to IR", generally refers to a wavelength of 760 nm to 1000 µm, wherein the wavelength of 760 nm to 3 µm is, usually, denominated as "near infrared", abbreviated to "NIR". Preferably, the optical radiation which is used for typical purposes of the present invention is IR radiation, more preferred, in NIR radiation, especially of a wavelength of 760 nm to 3 µm, preferably of 1 µm to 3 µm.

According to the present invention, the optical radiation is provided by at least one radiation emitting element designated for emitting the optical radiation. For this purpose, the spectral sensing device comprises at least one radiation emitting element which can be embodied in various ways. The at least one radiation emitting element can be part of the spectral sensing device in a housing. Alternatively or additionally, the at least one radiation emitting element can also be arranged outside a housing, e.g. as a separate radiation emitting element. The at least one radiation emitting element may be configured to provide sufficient emission in the desired spectral range, preferably in the optical spectral range as defined above or at least one selected partition thereof. The at least one radiation emitting element may, in particular, be comprised by at least one of a thermal radiator or a semiconductor-based radiation source. Herein, the semiconductor-based radiation source may, especially, be selected from at least one of a light emitting diode (LED) or a laser, in particular a laser diode. Further, the thermal radiator may, especially, be selected from at least one of an incandescent lamp or a thermal infrared emitter: As further used herein, the term "thermal infrared emitter" refers to a micro-machined thermally emitting device which comprises a radiation emitting surface as the radiation emitting element that emits the optical radiation to be monitored. Specifically, thermal infrared emitters are available as "emirs50" from Axetris AG, Schwarzenbergstrasse 10, CH-6056 Kägiswil, Switzerland, as "thermal infrared emitters" from LASER COMPONENTS GmbH, Werner-von-Siemens-Str. 15 82140 Olching, Germany, or as "infra-red emitters" from Hawkeye Technologies, 181 Research Drive #8, Milford CT 06460, United States. However; further types of radiation emitting elements, such as a structured light source, may also be feasible.

The at least one radiation emitting element may be a continuous light source or, alternatively, a pulsed light source, wherein the pulsed light source may have a modulation frequency of at least 1 Hz, of at least 5 Hz, of at least 10 Hz, of at least 50 Hz, of at least 100 Hz, of at least 500 Hz, of at least 1 kHz, or more. For driving the pulsed light source, a modulation device can be used, which may be designated for modulating the illumination, preferably by generating a periodic modulation. As generally used, the term "modulation" refers a process in which a total power of the illumination is varied, preferably periodically, in particular with at least one modulation frequency. In particular, a periodic modulation can be effected between a maximum value and a minimum value of the total power of the illumination. The minimum value can be 0, but can also be >0, such that, by way of example, complete modulation does not have to be effected. The modulation can, preferably, be effected within the radiation source designated for generating the desired modulated illumination, preferably, by the at least one radiation emitting element itself having a modulated intensity and/or total power, for example a periodically modulated total power, and/or by the at least one radiation emitting element being embodied as a pulsed radiation source, for example as a pulsed laser. As a further example, European patent application 19 21 32 77.7, filed Dec. 3, 2019, discloses at least one radiation emitting element which is designated for generating optical radiation upon being heated by an electrical current; a mount, wherein the mount carries the at least one radiation emitting element, and wherein the mount or a portion thereof is movable; and a heat sink, wherein the heat sink is designated for cooling the mount and the at least one radiation emitting element being carried by the mount upon being touched by the mount. Alternatively or additionally, a different type of modulation device, for example, a modulation device based on an electro-optical effect and/or an acousto-optical effect, can also be used. Further, at least one of a periodic beam interrupting device, in particular a beam chopper, an interrupter blade or an interrupter wheel, can also be used.

As further used herein, the term "spectrum" refers to a partition of the optical spectral range, wherein the spectrum is constituted by an optical signal defined by a signal wavelength and a corresponding signal intensity. In particular, the spectrum may comprise spectral information related to at least one measurement object, such as a type and composition of at least one material forming the at least one measurement object, which can be determined by recording at least one spectrum related to the at least one measurement object. The term "measurement object", generally, refers to an arbitrary body, chosen from a living object and a non-living object, which comprises material for investigation by the spectral sensing device. Further, the term "spectral sensing device" relates to an apparatus which is configured to determine spectral information by recording at least one measured value for at least one signal intensity related to at least one corresponding signal wavelength of optical radiation and by evaluating at least one detector signal which relates to the signal intensity.

Further according to the present invention, the spectral sensing device comprises at least one photosensitive detector. As generally used, the term "photosensitive detector" refers to an optical detector which comprises at least one photosensitive region that is, depending on the illumination of the at least one photosensitive region, designated for generating at least one detector signal, wherein the at least one detector signal may, in particular, be provided to the evaluation unit for evaluation. The at least one photosensitive region as comprised by the at least one photosensitive detector may, preferably, be a single, uniform photosensitive area which is configured for receiving the emitted optical radiation that impinges on the photosensitive area. However, more than one photosensitive areas, such as an areas of pixel-sized photosensitive areas, may also be feasible. The at least one photosensitive detector is designated for generating detector signals, preferably optical or electronic signals, which are associated with the intensity of the emitted optical radiation that impinges on the at least one photosensitive detector. The detector signal may be an analogue and/or a digital signal. In a particular embodiment, the at least one photosensitive detector may be or comprise an active sensor which is adapted to amplify the electronic signals prior to providing it, for example, to the external evaluation unit. For this purpose, the at least one photosensitive detector may comprise one or more signal processing devices, in particular one or more filters and/or analogue-digital-converters for processing and/or preprocessing the electronic signals.

The at least one photosensitive detector can be selected from any known optical sensor, in particular from an inorganic camera element, preferably from an inorganic camera chip, more preferred from a CCD chip or a CMOS chip, which are, commonly, used in various cameras nowadays. As an alternative, the at least one photosensitive detector, in particular the at least one photosensitive region, may comprise a photoconductive material, in particular an inorganic photoconductive material, especially selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). As generally used, the term "ext. InGaAs" refers to a particular type of InGaAs which exhibits a spectral response up to 2.6 µm. However, different kinds of materials or other types of photosensitive detectors may also be feasible.

Further according to the present invention, the spectral sensing device comprises at least one optical element, wherein the at least one optical element is designated to guide a first portion of the optical radiation as emitted by the at least one radiation emitting element to the at least one photosensitive detector. In a particularly preferred embodiment, the at least one optical element may further be designated to guide a second portion of the optical radiation as emitted by the at least one radiation emitting element to at least one measurement object. As used herein, the terms "first" or "second" are considered as a description of an element without specifying an order or a chronological sequence and without excluding a possibility that other elements of the same type may be present. In other words, the at least one radiation emitting element, the at least one optical element, and the at least one photosensitive detector may be assembled within the spectral sensing device in a fashion that the at least one optical element may function as a beam splitting element which is designated for partitioning the optical radiation as emitted by the at least one radiation emitting element into the first portion which is guided towards the at least one photosensitive detector in a direct fashion and the second portion which is guided towards the at least one photosensitive detector in an indirect fashion via the at least one measurement object. As generally used, the term "guiding" or any grammatical variation thereof refers to effecting a propagation of the optical radiation in a desired direction, in particular by reflecting or transmitting a portion of the optical radiation. In a preferred embodiment, the at least one optical element may be designated to reflect the first portion of the optical radiation to the at least one photosensitive detector and to transmit the second portion to the at least one measurement object. As a result, the at least one optical element may, thus, already function as a reflection target, such that employing a separate reflection target is dispensable. In a preferred alternative embodiment, the at least one optical element may be designated to transmit the first portion of the optical radiation to the at least one photosensitive detector and to reflect the second portion to the at least one measurement object.

Independently of the selected embodiment, a ratio R of the first portion of the optical radiation which is guided to the at least one photosensitive detector with respect to the second portion of the optical radiation which is guided to the at least one measurement object may, especially, exhibit a relationship according to Equation 1:

$$R \propto \frac{n_{optical\ element}}{n_{medium}}, \qquad (1)$$

wherein $n_{optical\ element}$ corresponds to a refractive index of the at least one optical element and $n_{medium}$ corresponds to the refractive index of at least one optically transparent medium which is traversed by the optical radiation propagating on a path from the at least one radiation emitting element to the at least one optical element.

In particular, the ratio R may be selected in a fashion that an intensity of the illumination by the first portion of the optical radiation as received by the at least one photosensitive region of the at least one photosensitive detector after the first portion of the optical radiation has been reflected by or transmitted through the at least one optical element, assumes a same order of magnitude as the intensity of the illumination on the at least one photosensitive region by the second portion of the optical radiation as received by the at least one photosensitive detector after the second portion of the optical radiation has been reflected by and/or transmitted through the at least one measurement object towards the at least one photosensitive region of the at least one photosensitive detector. As generally used, the term "same order of magnitude" refers to a quotient of two numbers of more than 0.1 but less than 10. In particular, the ratio R may be at least 0.15, preferably at least 0.2, more preferred at least 0.28, up to 7, preferably up to 5, more preferred up to 4.1.

In particular, the type of reflection of the first portion of the optical radiation at the at least one optical element to be guided to the at least one photosensitive detector can be a so-denoted "Fresnel reflection". As generally used, the term "Fresnel reflection" refers to a type of optical reflection as a result of an interface between at least two media having different refractive indices. By way of example, the Fresnel reflection, typically, occurs at a boundary surface between a layer of ambient air which adjoins a layer of glass. As a result, the optical radiation which can be emitted by the radiation emitting element may be propagating through the optically transparent medium, such as the layer of ambient air, an inert gas or a vacuum, to be reflected at the interface between the optically transparent medium and of the at least one optical element. In general, the Fresnel reflection has the advantage that it depends, as indicated above, on the refractive indices of both the at least one optically transparent medium and the at least one optical element. In particular, the refractive index $n_{optical\ element}$ of the at least one optical element exhibits only a slight change with the wavelength and the temperature of the material as comprised by the at least one optical element, at least within a temperature range in which the spectral sensing device may, typically, be used in consumer electronics. By way of example, an optical glass type BK7, which is, generally, use for such a purpose, has a refractive index of 1.4860 at a wavelength of 2.5 µm and 1.4945 at a wavelength of 2 µm.

For a special case of normal incident of the optical radiation onto a surface of the at least one optical element, the ratio R of the Fresnel reflection can be determined according to Equation (2) as $$R = \left[\frac{n_{optical\ element} - n_{medium}}{n_{optical\ element} + n_{medium}}\right]^2. \quad (2)$$

Preferably, the at least one optical element may be or comprise at least one optical window. As generally used, the term "optical window" refers to an optical element comprising at least one transparent material, wherein the at least one transparent material may, preferably, be at least partially transparent in at least one partition of a wavelength range as covered by the optical radiation. In particular, the at least one optical window may comprise at least one material selected from the group consisting of: silica, aluminosilicate glass, germanium, gallium arsenide, gallium phosphide, germane silicate glass, zinc selenide, zinc sulfide, calcium fluoride, magnesium fluoride, barium fluoride, sodium chloride, potassium bromide, calcite, fluorozirconate, rare earth doped glass, fluoride glass, chalcogenide glasses, sapphire, neodymium-doped yttrium orthovanadate, doped variants, especially for silica glass, phosphate glass, polymethylmethacrylate, polystyrene, or a fluoropolymer such as poly(perfluorobutenyl-vinylether). However, further types of optical elements, preferably at least one beam splitter, may also be feasible.

Specifically, the at least one optical element may additionally or alternatively be or comprise at least one internal optical element. As an example, the at least one internal optical element may comprise at least one piece of paper and/or polytetrafluoroethylene (PTFE), also referred to as Teflon™. The at least one internal optical element may be located within the spectral sensing device, specifically in a beam path of the optical radiation between the at least one radiation emitting element and the at least one photosensitive detector. As an example, the at least one internal optical element may be attached to, preferably glued on, an inner side of the at least one optical window of the spectral sensing device. Specifically, the at least one internal optical element may serve as a beam splitter within the spectral sensing device or may be part of a beam splitter. Thus, the at least one internal optical element may be configured for at least partially reflecting the optical radiation. As an example, the at least one internal optical element may cover a portion of the at least one optical window of the spectral sensing device, wherein the at least one internal element optical may be configured for reflecting the optical radiation towards the at least one photosensitive detector, wherein the at least one optical window may be configured for transmitting the optical radiation towards the at least one measurement object.

The at least one optical element may have known optical properties. Additionally or alternatively, at least one relationship between at least one optical property of the at least one optical element and at least one optical property of at least one external calibration target may be known, e.g. in form of at least one transfer function. The at least one external calibration target may specifically have precisely known optical properties. As an example, after fabrication of the spectral sensing device a factory calibration may be performed by using the at least one external calibration target. After the initial factory calibration, calibration of the spectral sensing device may be performed by using the at least one optical element and the at least one known relationship between the at least one optical property of the at least one optical element and the at least one optical property of the at least one external calibration target. In other words, the evaluation unit may be configured to perform the calibration of the spectral sensing device by using the at least one relationship between the at least one optical property of the at least one optical element and the at least one optical property of the at least one external calibration target. As said, the at least one optical element may specifically be assembled within the spectral sensing device as it is the case for the at least one internal optical element. Thus, the at least one optical element may e.g. be protected by a housing of the spectral sensing device. Thus, the at least one optical element may, specifically, have stable optical properties. Thus, the at least one relationship between the at least one optical property of the at least one optical element and the at least one optical property of the at least one external calibration target may be stable. As used herein, the term "stable" refers to a value of a property or a relationship which does remains constant over a period of time within predefined thresholds.

Further, the at least one optically transparent medium which is traversed by the optical radiation on the path from the at least one radiation emitting element to the at least one optical element may, in particular, be selected from the group consisting of: air, immersion oil, silica, aluminosilicate glass, germanium, gallium arsenide, gallium phosphide, germane silicate glass, zinc selenide, zinc sulfide, calcium fluoride, magnesium fluoride, barium fluoride, sodium chloride, potassium bromide, calcite, fluorozirconate, rare earth doped glass, fluoride glass, chalcogenide glasses, sapphire, Neodymium-doped yttrium orthovanadate, doped variants, especially for silica glass, phosphate glass, polymethylmethacrylate, polystyrene, a fluoropolymer such as poly(perfluoro-butenylvinyl ether), or vacuum. However, further kinds of optically transparent media may also be feasible.

By way of example, ambient air having a refractive index $n_{medium}=1$ could be selected as the optically transparent medium, while the optical element may comprise an optical glass type denoted as "BK7". Herein, the reflected portion of the optical radiation assumes a value of ≈3.9% of a total incident optical radiation impinging on the interface at a wavelength of 2 μm and a value of ≈3.82% at a wavelength of 2.5 μm, thus, leading to a wavelength-dependent reflection change of ≈2%. As a result, ≈96% of the incident optical radiation is transmitted to the at least one measurement object.

In a further example, the at least one optical element may be an optical window comprising silicon (Si). The refractive index $n_{optical\ element}$ of the silicon assumes a value of 3.4394 at a wavelength of 2.5 μm and a value of 3.4527 at a wavelength of 2 μm, thus, leading to a reflection of ≈30% of the total incident radiation on the silicon when ambient air is used as the optically transparent medium. Thus, only ≈70% of the incident optical radiation is transmitted to the at least one measurement object. Since the wavelength dependent change in the 30% share of the reflection is only ≈0.5%, the silicon window can, preferably, be used as a substantially wavelength-independent reflection target.

As a further example already indicated above, a beam splitter may, advantageously, be used, in particular, since the beam splitter does, in general, not exhibit any dependency of the reflection and the transmission on the wavelength of the incident optical radiation.

In general, the detector signal may vary with the reflectivity of the at least one measurement object. On one hand, for a measurement object having a weak grade of reflection, the at least one optical element may, preferably, comprise the optical glass type BK7 which transmits≈96% of the incident optical radiation to the measurement object. As a result, the at least one optical element comprising the optical glass type BK7 allows an intensive illumination of the measurement object as a kind of compensation. On the other hand, for a measurement object exhibiting a high grade of reflection, a silicon window may be preferred. However, further types of materials for the at least one optical element may also be feasible.

In a preferred embodiment, the spectral sensing device may, further, comprise at least one spectral transfer element. As used herein, the term "spectral transfer element" refers to an optical element which is configured to select at least one wavelength of the optical radiation, either of the first portion, of the second portion or of both portions thereof, to illuminate the at least one photosensitive region of the at least one photosensitive detector. In particular, the at least one spectral transfer element may, especially, be selected from the group consisting of: at least one diffractive optical element; at least one angle dependent reflective element, at least one diffractive grating element, in particular a blaze grating element; at least one prism; at least one lens array, in particular at least one micro lens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular at least one birefringent optical element, or at least one tunable Fabry-Perot interferometer; at least one tunable Michelson interferometer; or at least one linear variable filter. However, a further kind of spectral transfer element may also be feasible.

Further according to the present invention, the spectral sensing device comprises at least one evaluation unit. As generally used, the term "evaluation unit" refers to an apparatus which is designated for determining spectral information, i.e. information which is related to the spectrum of the measurement object of which a spectrum has been recorded, in particular, by using the at least one photosensitive detector as described herein, wherein the information is obtained by evaluating the at least one detector signal as generated by the at least one photosensitive detector. The evaluation unit may be or may comprise at least one of an integrated circuit, in particular an application-specific integrated circuit (ASIC), or a data processing device, in particular at least one of a digital signal processor (DSP), a field programmable gate array (FPGA), a microcontroller, a microcomputer, a computer, or an electronic communication unit, specifically a smartphone or a tablet. Further components may be feasible, in particular at least one preprocessing device or data acquisition device. Further, the evaluation unit may comprise at least one data storage unit, in particular for storing at least one electronic table, such as at least one look-up table. Further, the evaluation unit may comprise at least one interface, in particular at least one of a wireless interface or a wire-bound interface. Further, the evaluation unit can be designed to, completely or partially, control or drive the spectral sensing device or a part thereof. The evaluation unit can, in particular, be designed to carry out at least one measurement cycle in which a plurality of detector signals may be picked up. The spectral information as determined by the evaluation unit may, in particular, be provided to at least one of a further apparatus, or to a user, preferably in at least one of an electronic, visual, acoustic, or tactile fashion. Further, the information may be stored in at least one data storage unit, specifically in an internal data storage unit as comprised by the spectral sensing device, in particular by the at least one evaluation unit, or in an external storage device to which the information may be transmitted via the at least one interface.

The evaluation unit may, preferably, be configured to perform at least one computer program, in particular at least one computer program performing or supporting the step of generating the at spectral information. By way of example, one or more algorithms may be implemented which, by using the at least one detector signal as at least one input variable, may perform a transformation into a piece of spectral information. For this purpose, the evaluation unit may, particularly, comprise at least one data processing device, in particular at least one of an electronic or an optical data processing device, which can be designed to generate the spectral information by evaluating the at least one detector signal. Thus, the evaluation unit is designed to use at least one detector signal as the at least one input variable and to generate the spectral information by processing the at least one input variable. The processing can be performed in a consecutive, a parallel, or a combined manner. The evaluation unit may use an arbitrary process for generating the spectral information, in particular by calculation and/or using at least one stored and/or known relationship.

In particular, the at least one evaluation unit may, preferably, be configured to determine the spectral information related to the at least one measurement object by using the at least one second detector signal as generated by the at least one photosensitive detector upon the illumination of the at least one photosensitive region by the second portion of the optical radiation as received by the at least one photosensitive detector after the second portion of the optical radiation has been reflected by and/or transmitted through the at least one measurement object towards the at least one photosensitive region of the at least one photosensitive detector, whereby at least one piece of calibration information may be taken into account as described below in more detail.

In accordance with the present invention, the at least one evaluation unit is configured to perform a calibration of the spectral sensing device. As generally used, the term "calibration" refers to a process of correcting from time to time drifting effects that may occur, in practice, in the spectral sensing device, primarily caused by alterations related to the spectral sensing device itself or having an effect onto the spectral sensing device. The alterations may, especially, comprise at least one of: a degradation of at least one of the radiation emitting element or the photosensitive detector; a temperature drift of at least one of the radiation emitting element or the photosensitive detector; a variation of an ambient temperature affecting the spectral sensing device; a variation of a temperature related to the spectral sensing device, i.e. the temperature at which the at least one photosensitive detector and a corresponding electronics may operate; a mechanical extension or contraction of at least one component as comprised by the spectral sensing device, especially of at least one of a mechanical housing, a holder, or an optical element, specifically of the at least one optical window. However, further alterations may also be feasible.

Further, the term "performing a calibration" or any grammatical variation thereof refers to a conducting the process of generating at least one piece of calibration information, specifically, by correcting the drifting effects, particularly, in order to maintain a reliability of the measurement data, specifically by avoiding that the drifting effects may distort measurement data to such an extent that the results as determined by the spectral sensing device may become inconclusive. By performing the calibration, the at least one piece of calibration information may be determined, in particular, in form of a calibration factor, a calibration curve, or calibration function, which may, preferably, be stored in a data storage unit as a calibration file, specifically, in form of at least one of a table, a set of values and associated functions, in parameterized form, or as a functional equation. In particular, the at least one piece of calibration information can, preferably, be used in determining the spectral information related to the at least one measurement object. However, further manners of performing the calibration and storing or using the at one piece of least calibration information may also be conceivable.

For a purpose of performing the calibration, the evaluation unit is configured to use the at least one first detector signal which is generated by the at least one photosensitive detector upon the illumination of the at least one photosensitive region by the first portion of the optical radiation that is guided towards the at least one photosensitive detector. As particularly preferred, the calibration of the spectral sensing device is performed in a fashion that only the first portion of the optical radiation is guided towards the at least one photosensitive detector for illumination of the at least one photosensitive region in order to generate the at least one first detector signal. For this particularly preferred embodiment, the spectral sensing device may be assembled in a fashion that no optical radiation originating from the at least one measurement object, such as reflected by the at least one measurement object and/or transmitted through the at least one measurement object, may illuminate the at last one photosensitive region of the at least one photosensitive detector during a time interval in which the calibration of the spectral sensing device may be performed.

For a purpose of determining whether a volume in front of the at least one photosensitive detector may be occupied or not, the spectral sensing device may, in a particularly preferred embodiment, further comprise at least one measurement unit. As generally used, the term "measurement unit" refers to an apparatus which is designated for generating at least one measurement signal, wherein the at least one measurement signal is dependent on at least one value that is related to at least one measurable parameter. As used herein, the term "measurement unit", specifically, refers to an apparatus which is designated for generating at least one measurement signal which is dependent on an occupation of the volume in front of the at least one photosensitive detector. As used herein, the term "volume" refers to a periphery of the spectral sensing device which is designated for receiving the at least one measurement object in a fashion that optical radiation which is reflected by and/or transmitted through the at least one measurement object is capable of impinging the at least one photosensitive region of the at least one photosensitive detector. Herein, the volume may, especially for practical purposes, be limited to at least one distance range from a housing of the spectral sensing device, By determining whether the volume in front of the at least one photosensitive detector may be occupied or not, it is possible to avoid that the optical radiation which originates from the at least one measurement object may impinge the at least one photosensitive region of the at least one photosensitive detector and may, undesirably, influence the calibration of the spectral sensing device.

In this particularly preferred embodiment, the at least one evaluation unit may be configured to perform the calibration of the spectral sensing device by, additionally, using the at least one measurement signal which is generated by the at least one measurement unit. Specifically, the at least one evaluation unit may be configured to perform the calibration of the spectral sensing device only within a time interval in which the at least one measurement signal as generated by the at least one measurement unit indicates that the volume in front of the at least one photosensitive detector is not occupied. This time interval may, particularly preferred, be identical with the time interval as defined above in which no optical radiation originating from the at least one measurement object may illuminate the at last one photosensitive region of the at least one photosensitive detector since no measurement object may be present as indicated by the at least one measurement unit.

For a purpose of generating at least one measurement signal which is dependent on an occupation of the volume in front of the at least one photosensitive detector, the at least one measurement unit may be or comprise at least one presence sensor. As generally used, the term "presence sensor" refers to a sensor element which is configured to recognize a presence of a person or an item, especially in a volume located in front of the presence sensor within a predefined distance range. In particular, the at least one presence sensor may be selected from at least one of a proximity sensor or a distance sensor. Preferably, the at least one measurement unit may be selected from at least one of: an ultrasonic sensor, an optical sensor, an inductive sensor, a tactile sensor, a radar sensor, a time-of-flight sensor, a triangulation sensor, a stereo sensor, a structured light sensor, a capacitive sensor, a FIP sensor, or a BPA sensor. For the FIP sensor, reference can, for example, be made to WO 2012/110924 A1, WO 2014/097181 A1, or WO 2016/120392 A1. For the BPA sensor, reference can, for example, be made to WO 2018/091640 A2.

In a further aspect of the present invention, a method for measuring optical radiation is disclosed. The method as disclosed herein comprises the following steps a) to d), which may, preferably, be performed in a continuous fashion, wherein step a) to d) may, at least partially, be performed in a simultaneous manner. Further, additional steps whether listed herein or not can also be performed.

The method for measuring optical radiation according to the present invention comprises the following steps:
a) emitting optical radiation by using at least one radiation emitting element;
b) guiding a first portion of the optical radiation to the at least one photosensitive detector by using at least one optical element;
c) generating at least one detector signal by using at least one photosensitive detector, wherein the at least one photosensitive detector has at least one photosensitive region designated for receiving the optical radiation, wherein at least one detector signal as generated by the at least one photosensitive detector is dependent on an illumination of the at least one photosensitive region; and
d) performing a calibration of the spectral sensing device by using at least one first detector signal as generated by the at least one photosensitive detector upon the illumination of the at least one photosensitive region by the first portion of the optical radiation by using at least one evaluation unit.

Furthermore, any one of the following further steps e) to g) may, preferably, be performed, in addition:
e) generating at least one measurement signal by using at least one measurement unit, wherein the at least one measurement signal is dependent on an occupation of a volume in front of the at least one photosensitive detector.
f) using at least one optical element to guide a second portion of the optical radiation to at least one measurement object; and
g) determining spectral information related to the at least one measurement object by using at least one second detector signal as generated by the at least one photosensitive detector upon the illumination of the at least one photosensitive region by the second portion of the optical radiation and by taking into account at least one piece of calibration information as obtained during step d).

According to step a), optical radiation is emitted by using at least one radiation emitting element, in particular a radiation emitting element as described above or below in more detail.

According to step b), a first portion of the optical radiation as emitted by the at least one radiation emitting element is guided to the at least one photosensitive detector by using at least one optical element, while, according to step f), at least one optical element may be used, in addition, to guide a second portion of the optical radiation as emitted by the at least one radiation emitting element to at least one measurement object. Herein, information related to at least one measurement object may, according to step g), be determined by using at least one second detector signal as generated by the at least one photosensitive detector upon the illumination of the at least one photosensitive region by the second portion of the optical radiation as guided to the at least one photosensitive detector and the at least one piece of calibration information as determined according to step d).

According to step c), at least one detector signal is generated by using at least one photosensitive detector, in particular a photosensitive detector as described above or below in more detail, wherein the at least one photosensitive detector has at least one photosensitive region which is designated for receiving the emitted optical radiation, and wherein the at least one detector signal is dependent on an illumination of the at least one photosensitive region.

According to step d), a calibration of the spectral sensing device is performed by using at least one evaluation unit by taking into account at least one first detector signal which is generated by the at least one photosensitive detector upon the illumination of the at least one photosensitive region by the first portion of the optical radiation as guided towards the at least one photosensitive detector, in particular when a volume in front of the at least one photosensitive detector as, preferably, determined during step e) is not occupied, especially not by the at least one measurement object.

According to step e), at least one measurement signal may, particularly preferred, be generated by using at least one measurement unit in a fashion that the at least one measurement signal is dependent on an occupation of the volume in front of the at least one photosensitive detector, especially within at least one predefined distance range from a surface of the housing of the spectral sensing device.

In a further aspect, the present invention refers to computer program, which comprises executable instructions which, when the program is executed by a computer, cause the computer to carry out the steps of the method for measuring optical radiation as described elsewhere herein. The computer program comprising executable instructions may, preferably, fully or partially be integrated into the evaluation unit, in particular into a data processing device, in particular a computer or an electronic communication unit, specifically a smartphone or a tablet. The computer program may be capable of performing the method using at least one data processing unit already comprised by the evaluation unit, in particular the electronic communication unit. By way of example, the method may be performed as an application, also denoted by the term "app", on the electronic communication unit.

In a further aspect of the present invention, a use of a spectral sensing device according to the present invention is disclosed. Therein, the use of the spectral sensing device for a purpose of determining information, in particular spectral information, which is related to the at least one measurement object is proposed. Herein, the spectral sensing device may, preferably, be used for a purpose of use, selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application. However, further applications may also be feasible.

For further details concerning the method for measuring optical radiation, the corresponding computer program, and the respective uses of the spectral sensing device according to the present invention, reference may be made to the description of the spectral sensing device for measuring optical radiation as provided elsewhere herein.

The spectral sensing device and the method for measuring optical radiation as disclosed herein have considerable advantages over the prior art. The spectral sensing device and the method according to the present invention is configured to perform, preferably in a fully automatized fashion, a self-calibration without requiring any predefined reflection target. Thus, the spectral sensing device and the method may specifically be configured for performing a self-calibration without user involvement. In particular, the spectral sensing device and the method may be used to enhance a reliability of measurement results of the spectral sensing device and multi-pixel sensing solutions, and may, especially, be used for enabling self-calibration of IR sensing modules based on multi-pixel solutions. Specifically, the spectral sensing device and the method may be configured for correcting drifting effects that may occur, in practice, in the spectral sensing device. As a result, the spectral sensing device and the method as disclosed herein may facilitate use and calibration of the devices by a user. Thus, spectral sensing devices of this kind can be used by everyday users in consumer electronics.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restriction regarding the scope of the invention and without any restriction regarding the possibility of combining the features introduced in such a way with other optional or non-optional features of the invention.

Summarizing, in the context of the present invention, the following embodiments are regarded as particularly preferred:

Embodiment 1: A spectral sensing device for measuring optical radiation, comprising:
  at least one photosensitive detector, wherein the at least one photosensitive detector has at least one photosensitive region designated for receiving optical radiation, wherein at least one detector signal as generated by the at least one photosensitive detector is dependent on an illumination of the at least one photosensitive region;
  at least one radiation emitting element, wherein the at least one radiation emitting element is designated for emitting the optical radiation;
  at least one optical element, wherein the at least one optical element is designated to guide a first portion of the optical radiation to the at least one photosensitive detector;
  at least one evaluation unit, wherein the at least one evaluation unit is configured to perform a calibration of the spectral sensing device by using at least one first detector signal as generated by the at least one photosensitive detector upon the illumination of the at least one photosensitive region by the first portion of the optical radiation.

Embodiment 2: The spectral sensing device according to the preceding Embodiment, wherein the calibration refers to a process of correcting from time to time drifting effects occurring in the spectral sensing device, wherein the drifting effects are caused by alterations related to the spectral sensing device itself or having an effect onto the spectral sensing device.

Embodiment 3: The spectral sensing device according to any one of the preceding Embodiments, wherein a type of reflection of the first portion of the optical radiation at the at least one optical element to be guided to the at least one photosensitive detector is a Fresnel reflection.

Embodiment 4: The spectral sensing device according to any one of the preceding Embodiments, wherein the at least one optical element is assembled within the spectral sensing device.

Embodiment 5: The spectral sensing device according to any one of the preceding Embodiments, wherein at least one relationship between at least one optical property of the at least one optical element and at least one optical property of at least one external calibration target is known, wherein the at least one evaluation unit is configured to perform the calibration of the spectral sensing device by using the at least one relationship between the at least one optical property of the at least one optical element and the at least one optical property of the at least one external calibration target.

Embodiment 6: The spectral sensing device according to any one of the preceding Embodiments, wherein the at least one evaluation unit is configured to perform the calibration of the spectral sensing device by using the at least one first detector signal as generated by the at least one photosensitive detector upon the illumination of the at least one photosensitive region only by the first portion of the optical radiation.

Embodiment 7: The spectral sensing device according to any one of the preceding Embodiments, further comprising at least one measurement unit, wherein the at least one measurement unit is designated for generating at least one measurement signal, wherein the at least one measurement signal is dependent on an occupation of a volume in front of the at least one photosensitive detector.

Embodiment 8: The spectral sensing device according to the preceding Embodiment, wherein the at least one evaluation unit is configured to perform the calibration of the spectral sensing device by further using the at least one measurement signal as generated by the at least one measurement unit.

Embodiment 9: The spectral sensing device according to the preceding Embodiment, wherein the at least one evaluation unit is configured to perform the calibration of the spectral sensing device only if the at least one measurement signal as generated by the at least one measurement unit indicates that the volume in front of the at least one photosensitive detector is not occupied.

Embodiment 10: The spectral sensing device according to any one of the three preceding Embodiments, wherein the at least one measurement unit is or comprises at least one presence sensor.

Embodiment 11: The spectral sensing device according to the preceding Embodiment, wherein the at least one presence sensor is selected from at least one of a proximity sensor or a distance sensor.

Embodiment 12: The spectral sensing device according to any one of the five preceding Embodiments, wherein the at least one measurement unit is selected from at least one of an ultrasonic sensor, an optical sensor, an inductive sensor, a tactile sensor, a radar sensor, a time-of-flight sensor, a triangulation sensor, a stereo sensor, a structured light sensor, a capacitive sensor, a FIP sensor, or a BPA sensor.

Embodiment 13: The spectral sensing device according to any one of the preceding Embodiments, wherein the at least one optical element is further designated to guide a second portion of the optical radiation to at least one measurement object.

Embodiment 14: The spectral sensing device according to the preceding Embodiment, wherein the at least one optical element is designated for reflecting the first portion of the optical radiation to the at least one photosensitive detector and transmitting the second portion of the optical radiation to the at least one measurement object.

Embodiment 15: The spectral sensing device according to any one of the two preceding Embodiments, wherein the at least one optical element is designated for transmitting the first portion of the optical radiation to the at least one photosensitive detector and reflecting the second portion of the optical radiation to the at least one measurement object.

Embodiment 16: The spectral sensing device according to any one of the preceding Embodiments, wherein a ratio R of the first portion of the optical radiation with respect to the second portion of the optical radiation depends on a relationship of a refractive index $n_{optical\ element}$ of the at least one optical element with respect to the refractive index $n_{medium}$ of at least one optically transparent medium which is traversed by the optical radiation on a path from the at least one radiation emitting element to the at least one optical element.

Embodiment 17: The spectral sensing device according to any one of the preceding Embodiments, wherein the at least one optical element is or comprises at least one of an optical window or a beam splitter.

Embodiment 18: The spectral sensing device according to the preceding Embodiment, wherein the at least one optical element comprises at least one transparent material.

Embodiment 19: The spectral sensing device according to the preceding Embodiment, wherein the at least one transparent material is at least partially transparent in at least a partition of a wavelength range as covered by the optical radiation.

Embodiment 20: The spectral sensing device according to any one of the seven preceding Embodiments, wherein the at least one evaluation unit is further configured to determine spectral information related to the at least one measurement object by using at least one second detector signal as generated by the at least one photosensitive detector upon the illumination of the at least one photosensitive region by the second portion of the optical radiation.

Embodiment 21: The spectral sensing device according to any one of the preceding Embodiments, wherein the at least one radiation emitting element is comprised by at least one of a thermal radiator or a semiconductor-based radiation source.

Embodiment 22: The spectral sensing device according to the preceding Embodiment, wherein the at least one semiconductor-based radiation source is selected from at least one of a light emitting diode (LED) or a laser, in particular a laser diode.

Embodiment 23: The spectral sensing device according to any one of the preceding Embodiments, wherein the least one photosensitive detector is selected from a known optical sensor, in particular from an inorganic camera element, preferably from an inorganic camera chip, more preferred from a CCD chip or a CMOS chip.

Embodiment 24: The spectral sensing device according to any one of the preceding Embodiments, wherein the least one photosensitive detector, in particular the at least one photosensitive region, comprises at least one photoconductive material.

Embodiment 25: The spectral sensing device according to the preceding Embodiment, wherein the at least one photoconductive material is selected from at least one of PbS, PbSe, Ge, InGaAs, InSb, or HgCdTe.

Embodiment 26: The spectral sensing device according to any one of the preceding Embodiments, further comprising at least one spectral transfer element, whereas at least one spectral transfer element is configured to select at least one wavelength of the optical radiation to illuminate the at least one photosensitive region of the at least one photosensitive detector.

Embodiment 27: The spectral sensing device according to the preceding Embodiment, wherein the at least one spectral transfer element is selected from the group consisting of: at least one diffractive optical element; at least one angle dependent reflective element, at least one diffractive grating element, in particular a blaze grating element; at least one prism; at least one lens array, in particular at least one micro lens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular at least one birefringent optical element, or at least one tunable Fabry-Perot interferometer; at least one tunable Michelson interferometer; or at least one linear variable filter.

Embodiment 28: The spectral sensing device according to any one of the preceding Embodiments, wherein a spectral sensitivity of the at least one photosensitive detector is covered by a spectral range of the at least one radiation emitting element.

Embodiment 29: The spectral sensing device according to any one of the preceding Embodiments, wherein the emitted optical radiation comprises a wavelength of 760 nm to 1000 µm (infrared spectral range).

Embodiment 30: The spectral sensing device according to the preceding Embodiment, wherein the emitted optical radiation comprises a wavelength of 760 nm to 3 µm (near-infrared spectral range).

Embodiment 31: The spectral sensing device according to the preceding Embodiment, wherein the emitted optical radiation comprises a wavelength of 1 µm to 3 µm.

Embodiment 32: The spectral sensing device according to any one of the preceding Embodiments, wherein the evaluation unit is or is comprised by at least one electronic communication unit.

Embodiment 33: The spectral sensing device according to the preceding Embodiment, wherein the at least one electronic communication unit is selected from a smartphone or a tablet.

Embodiment 34: The spectral sensing device according to any one of the preceding Embodiments, wherein the evaluation unit is further designed to, completely or partially, control or drive the spectral sensing device or a part thereof.

Embodiment 35: The spectral sensing device according to any one of the preceding Embodiments, wherein the evaluation unit is further configured to control at least one of the at least one radiation emitting element and the at least one photosensitive detector.

Embodiment 36: The spectral sensing device according to any one of the preceding Embodiments, wherein the information as determined by the evaluation unit is provided to at least one of a further apparatus or to a user in at least one of an electronic, visual, acoustic, or tactile fashion.

Embodiment 37: The spectral sensing device according to any one of the preceding Embodiments, wherein the information as determined by the evaluation unit is stored in at least one data storage unit.

Embodiment 38: The spectral sensing device according to the preceding Embodiment, wherein the at least one data storage unit is comprised by the spectral sensing device, in particular by the at least one evaluation unit.

Embodiment 39: The spectral sensing device according to any one of the two preceding Embodiments, wherein the at least one data storage unit is a separate storage unit.

Embodiment 40: The spectral sensing device according to the preceding Embodiment, wherein the separate storage unit is comprised by the at the least one electronic communication unit.

Embodiment 41: The spectral sensing device according to the two preceding Embodiments, wherein the information is transmitted to the separate storage unit via at least one interface, in particular a wireless interface and/or a wirebound interface.

Embodiment 42: A method for measuring optical radiation, the method comprising the following steps:
a) emitting optical radiation by using at least one radiation emitting element;
b) guiding a first portion of the optical radiation to the at least one photosensitive detector by using at least one optical element;
c) generating at least one detector signal by using at least one photosensitive detector, wherein the at least one photosensitive detector has at least one photosensitive region designated for receiving the optical radiation, wherein at least one detector signal as generated by the at least one photosensitive detector is dependent on an illumination of the at least one photosensitive region; and
d) performing a calibration of the spectral sensing device by using at least one first detector signal as generated by the at least one photosensitive detector upon the illumination of the at least one photosensitive region by the first portion of the optical radiation by using at least one evaluation unit.

Embodiment 43: The method according to the preceding Embodiment, wherein the method comprises the following step:
e) generating at least one measurement signal by using at least one measurement unit, wherein the at least one measurement signal is dependent on an occupation of a volume in front of the at least one photosensitive detector.

Embodiment 44: The method according to any one of the two preceding claims, wherein the method further comprises the following steps:
f) using at least one optical element to guide a second portion of the optical radiation to at least one measurement object; and
g) determining spectral information related to the at least one measurement object by using at least one second detector signal as generated by the at least one photosensitive detector upon the illumination of the at least one photosensitive region by the second portion of the optical radiation and by taking into account at least one piece of calibration information as obtained during step d).

Embodiment 45: A computer program comprising instructions which, when the program is executed by a computer, cause the computer to carry out the steps of the method for measuring optical radiation.

Embodiment 46: A use of a spectral sensing device according to any one of the preceding Embodiments referring to a spectral sensing device or to a spectral sensing device, for a purpose of use, selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the Figures.

EXEMPLARY EMBODIMENTS

Figure 1:
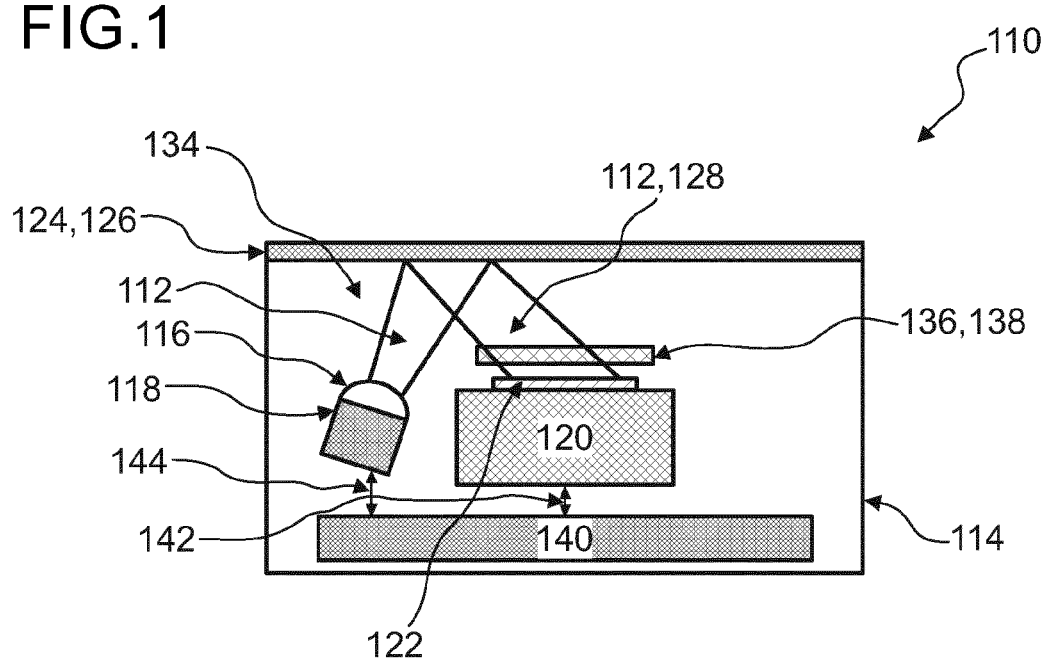
FIGS. 1 to 5 illustrates each a schematic view of an exemplary embodiment of a spectral sensing device.

FIGS. 1 to 5 illustrate each, in a highly schematic fashion, an exemplary embodiment of a spectral sensing device 110 according to the present invention. The spectral sensing device 110 is an apparatus which is configured to determine spectral information by recording at least one measured value for at least one signal intensity related to at least one corresponding signal wavelength of optical radiation 112 and by evaluating at least one detector signal which relates to the signal intensity. According to the present invention, the spectral sensing device 110 may, especially, be adapted for recording a spectrum in the infrared (IR) spectral region, preferably, in the near-infrared (NIR), especially, wherein for a wavelength of 760 nm to 3 μm, preferably of 1 μm to 3 μm. Accordingly, the spectral sensing device 110 can be used for investigation or monitoring purposes as well as for a detection of heat, flames, fire, or smoke. However, further applications of the spectral sensing device 110 may also be feasible.

In the embodiments as depicted in FIGS. 1 to 5, the spectral sensing device 110 comprises a housing 114 which encompasses the components of the spectral sensing device 112. In this fashion, the components of the spectral sensing device 110 can be protect and access of external light may be impeded. However, further kinds of arrangements of the components of the spectral sensing device 110 may also be conceivable.

The exemplary spectral sensing device 110 as schematically depicted in FIGS. 1 to 5 comprises a radiation emitting element 116 which is configured to emit the optical radiation 112. In particular, the radiation emitting element 116 may be comprised by a semiconductor-based 35 radiation source 118 which may, preferably, be selected from at least one of a light emitting diode (LED) or a laser, in particular a laser diode. However, a further type of radiation emitting element 116 may also be feasible. The radiation emitting element 116 may be continuously emitting, or generating modulated optical pulses, as described above in more detail.

Further, the exemplary spectral sensing device 110 as schematically depicted in FIGS. 1 to 5 comprises a photosensitive detector 120. As illustrated there, the photosensitive detector 120 has a single photosensitive region 122 which is designated for receiving the optical radiation 112. The photosensitive region 120 may, preferably, comprise at least one photoconductive material, particularly, selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). Different kinds of photoconductive materials or other types kinds of photosensitive detectors may also be feasible.

Figure 2:
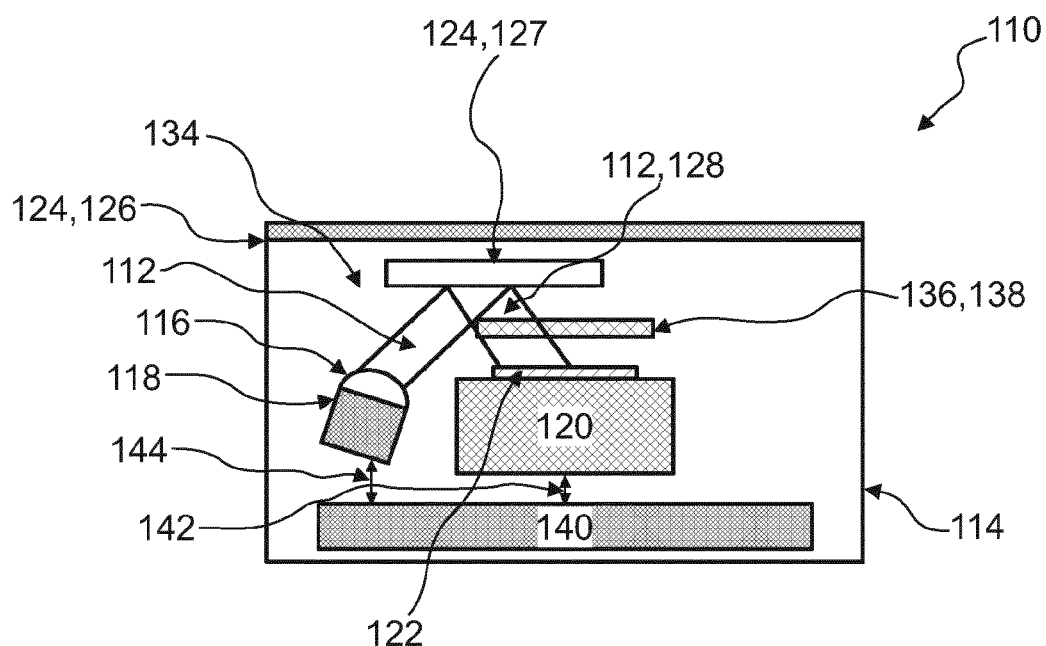
Figure 3:
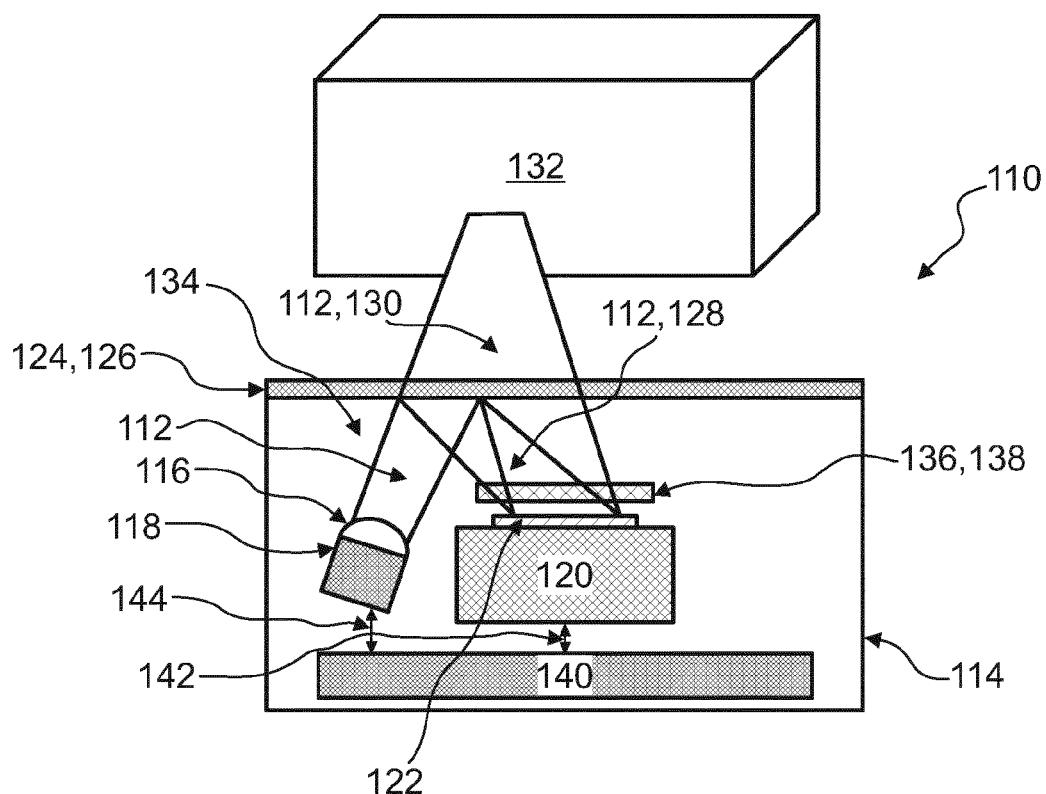

The exemplary spectral sensing device 110 as illustrated in FIGS. 1 to 5, further, comprises an optical element 124, in particular an optical window 126, preferably, selected from a glass window or a silicon window. As an example already indicated above, a beam splitter may, advantageously, be used. For further materials, reference may be made to the description above. Herein, the at least one transparent material as comprised by the optical window 126 may, preferably, be at least partially transparent in at least one partition of a wavelength range as covered by the optical radiation 112. The optical element 124 may further be or comprise at least one internal optical element 127 as depicted in FIG. 2. As an example, the internal optical element 127 may comprise at least one piece of paper and/or polytetrafluoroethylene (PTFE), also referred to as Teflon™. The internal optical element 127 may be located within the spectral sensing device 110, specifically in a beam path of the optical radiation 112 between the radiation emitting element 116 and the photosensitive detector 120. The at least one internal optical element 127 may be configured for at least partially reflecting the optical radiation 112. Specifically, the internal optical element 127 may be configured for at least partially guiding the optical radiation 112 to the photosensitive detector 120.

As schematically depicted there, the optical element 124 is configured to guide a first portion 128 of the optical radiation 112 as emitted by the radiation emitting element 116 to the photosensitive detector 120, in particular to the photosensitive region 122. As further illustrated in FIGS. 2 to 4, the optical element 124 may, further, be configured to guide a second portion 130 of the optical radiation 112 as emitted by the radiation emitting element 116 to a measurement object 132. The measurement object 132 may be or comprise an arbitrary body, chosen from a living object and a non-living object, which comprises material for investigation or monitoring by the spectral sensing device 110. As a result of this particular assembly of the radiation emitting element 116, the optical element 124, and the photosensitive detector 120 within the spectral sensing device 110, the optical element 124 may function as a beam splitting element which is designated for partitioning the optical radiation 112 as emitted by the radiation emitting element 116 into the first portion 128 guided towards the photosensitive detector 120 in a direct fashion and into the second portion 130 guided towards the at least one photosensitive detector 120 in an indirect fashion via the measurement object 124.

As illustrated in FIGS. 1 to 5, the optical element 124 reflects the first portion 128 of the optical radiation 112 to the photosensitive detector 120, in particular to the photosensitive region 122, and transmits the second portion 130 to the at least one measurement object 124. However, in an alternative embodiment (not depicted here), the optical element 124 may transmit the first portion 128 of the optical radiation 112 to the photosensitive detector 120, in particular to the photosensitive region 122, and reflect the second portion 130 to the measurement object 124. Independently of the chosen embodiment, the optical radiation traverses an optically transparent medium 134 on a path from the radiation emitting element 116 to the optical element 124. Herein, the optically transparent medium 134 may, especially, be selected from ambient air, an inert gas or vacuum, however, a further material as indicated above in more detail may also be feasible.

As further illustrated in FIGS. 1 to 5, the spectral sensing device 110 may, further, comprise a spectral transfer element 136 which is configured to select at least one wavelength of the optical radiation 112, either of the first portion 128 and/or of the second portion 130, to illuminate the photosensitive region 122 of the photosensitive detector 120. As schematically depicted here, the spectral transfer element 136 may, especially, be an optical filter 138, such as a polarization filter; or bandpass filter, however, a further kind of spectral transfer element 136 may also be feasible. In further embodiments (not depicted here), the spectral transfer element 136 may also be dispensable.

As further schematically depicted in FIGS. 1 to 5, the spectral sensing device 110 further comprises an evaluation unit 140 which is configured to perform a calibration of the spectral sensing device 110 by using a first detector signal as generated by the photosensitive detector 120 upon the illumination of the photosensitive region 122 by the first portion 128 of the optical radiation 112, which is guided to the photosensitive detector 120 via the optical element 124 in a direct fashion. As further illustrated in FIGS. 3 to 5, the evaluation unit 140 is, additionally, configured here to determine spectral information related to the measurement object 132 by using a second detector signal as further generated by the photosensitive detector 120 upon the illumination of the photosensitive region 122 by the second portion 130 of the optical radiation 112, which has been reflected by the measurement object 132 and/or transmitted through the measurement object 132 towards the photosensitive region 122 of the photosensitive detector 120.

For this purpose, the evaluation unit 140 is configured for receiving the first detector signal and, preferably, the second detector signal via an interface 142, specifically in a wirebound or a wireless fashion. Generally, the evaluation unit 140 may be part of a data processing device and/or may comprise one or more data processing devices. The evaluation unit 140 may comprise one or more additional components, in particular one or more electronic hardware components and/or one or more software components and/or one or more controlling units. As illustrated here, the evaluation unit 140 can, in addition, be designed to, completely or partially, control or drive the spectral sensing device 112, or a component thereof, in particular, the photosensitive detector 120, especially via the interface 142, and/or the radiation emitting element 116, especially via a further interface 144.

In the exemplary embodiments as depicted in FIGS. 1 to 5, the evaluation unit 140 is fully integrated into the housing 114; however, an external evaluation unit (not depicted here) which may be provided as a separate entity located outside the housing 114, such as part of an electronic communication unit, specifically a smartphone or a tablet, may also be feasible. The information which is determined by the evaluation unit 140 can be provided to one or more further apparatus or users in an electronic, visual, acoustic and/or tactile fashion. By way of example, the information can be displayed using a monitor of the smartphone. Further, the information may be stored in a data storage unit (not depicted here), which may be comprised by the evaluation unit 140, or by a separate storage device, such as the smartphone.

In accordance with the present invention, the evaluation unit 140 is configured to perform a calibration of the spectral sensing device 110. As defined above, the calibration refers to a process of correcting from time to time drifting effects that may occur, in practice, in the spectral sensing device 110, primarily caused by alterations related to the spectral sensing device 110 itself or having an effect onto the spectral sensing device 110. Possible alterations are listed above. By performing the calibration the user of the spectral sensing device 110, in particular, aspires to maintain a reliability of the measurement data, specifically by avoiding that the drifting effects may distort measurement data to such an extent that the results as determined by the spectral sensing device 110 may become inconclusive.

For a purpose of performing the calibration, the evaluation unit 140 is configured to use the first detector signal as generated by the photosensitive detector 120 upon the illumination of the photosensitive region 122 by the first portion 128 of the optical radiation 112 which is guided towards the photosensitive detector 120, in particular to the photosensitive region 122. Hereby it is preferred to perform the calibration of the spectral sensing device 110 in a manner that only the first portion 128 of the optical radiation 112 is actually guided towards the photosensitive detector 120 to illuminate the photosensitive region 122 for generating the first detector signal. For this purpose, the spectral sensing device 110 as shown in FIGS. 1 and 5 is assembled in a fashion that no optical radiation that may originate from the measurement object 132, either reflected by the measurement object 132 and/or transmitted through the measurement object 132, may actually illuminate the photosensitive region 122 of the photosensitive detector 120 during a time interval in which the calibration of the spectral sensing device 110 is performed.

For this purpose, it may, in particular, be determined whether a volume 146 in front of the photosensitive detector 120 may be occupied or not. Whereas in the embodiment as depicted in FIG. 4 the volume 146 in front of the photosensitive detector 120 is occupied by the measurement object 132, the volume 146 in front of the photosensitive detector 120 in the embodiment as schematically illustrated in FIG. 5 is free, i.e. not occupied by any object, especially any measurement object 132.

Figure 4:
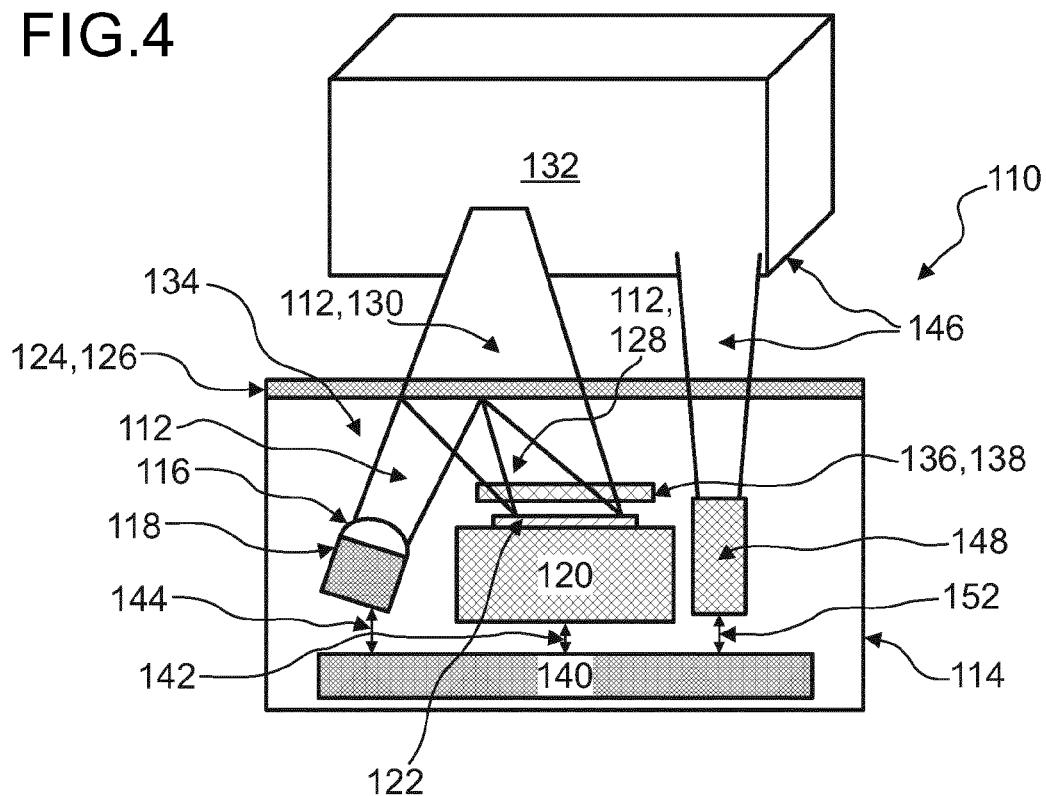
Figure 5:
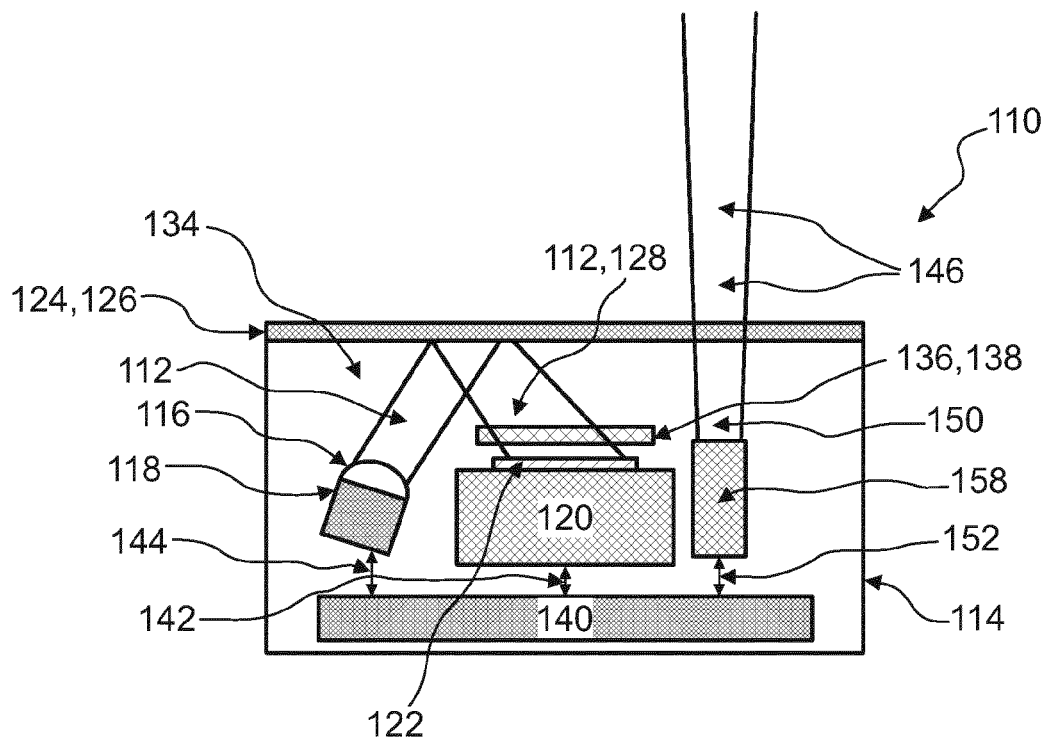

For a purpose of automatically determining whether the volume 146 in front of the photosensitive detector 120 may be occupied or not, the spectral sensing device 110 as shown in FIGS. 4 and 5 further comprises a measurement unit 148. As depicted, the measurement unit 148 is designated for generating a measurement signal which depends on an occupation of the volume 146 in front of the at least one photosensitive detector 120. For this purpose, the measurement unit 148 as illustrated there is configured to emit a beam 150 and to observe whether an absorption of the beam 150 may occur or not. Herein, the measurement unit 148 may be or comprise a presence sensor, preferably, a proximity sensor and/or a distance sensor, in particular, selected from an ultrasonic sensor, an optical sensor, a radar sensor, a time-of-flight sensor. However, a further kind of sensor, such as indicated above, may also be feasible.

As further illustrated there, the evaluation unit 140 can, in addition, be designed to, completely or partially, control or drive the measurement unit 148, especially via a further interface 152.

By determining whether the volume 146 in front of the photosensitive detector 120 may be occupied or not, it is possible to avoid that the optical radiation 130 which originates from the measurement object 132 may impinge the photosensitive region 122 of the photosensitive detector 120 and may, undesirably, influence the calibration of the spectral sensing device 110. Herein, the evaluation unit 140 may be configured to perform the calibration of the spectral sensing device 110 by, additionally, using the measurement signal as generated by the measurement unit 148, specifically, in a manner that the evaluation unit 140 may perform the calibration of the spectral sensing device 110 only within a time interval in which the measurement signal as generated by the measurement unit 148 indicates that the volume 146 in front of the photosensitive detector 120 is not occupied.

Figure 6:
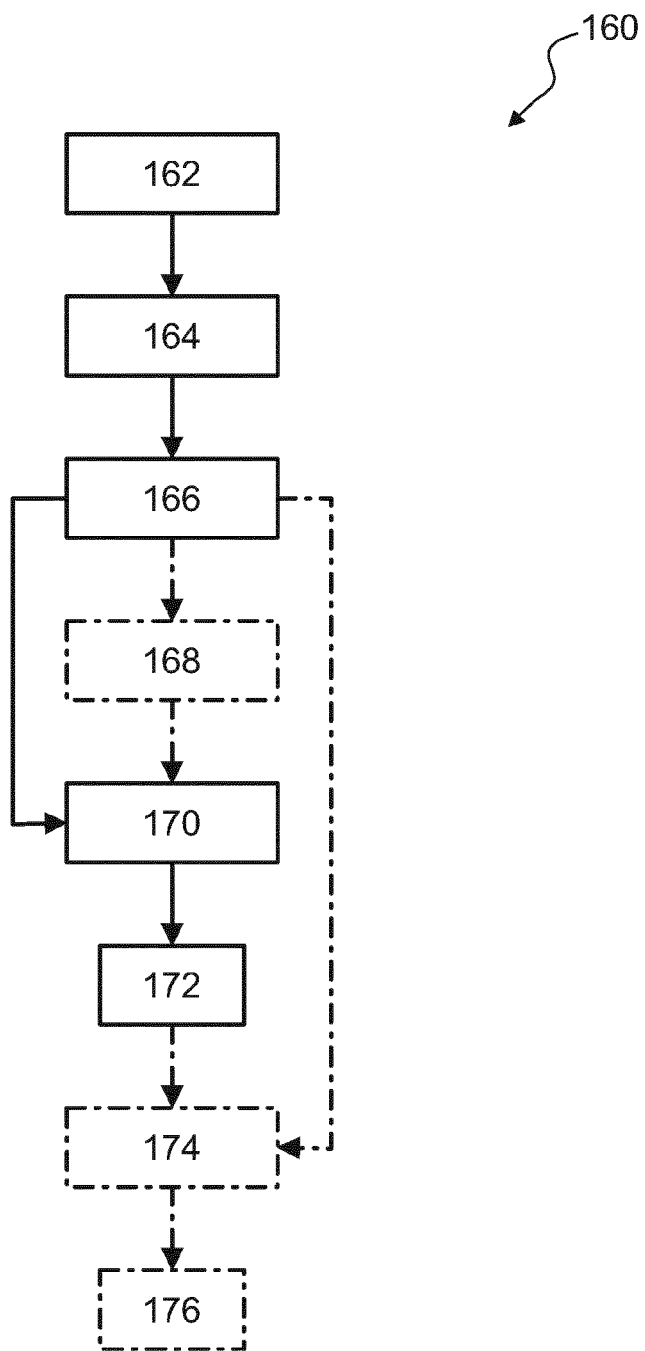
FIG. 6 illustrates a schematic view of an exemplary embodiment of a method for measuring optical radiation according to the present invention.

FIG. 6 illustrates, in a highly schematic fashion, a view of an exemplary embodiment of a method 160 for measuring the optical radiation 112 according to the present invention.

In an emitting step 162 according to step a), the desired optical radiation 112 is emitted by using the radiation emitting element 116.

In a guiding step 164 according to step b), the first portion 128 of the optical radiation 112 as emitted by the radiation emitting element 116 is guided to the photosensitive detector 120, in particular to the photosensitive region 122, by using the optical element 124, especially the optical window 126. In addition, the optical element 124, especially the optical window 126, may, according to step f), be used to further guide the second portion 130 of the optical radiation 112 as emitted by the radiation emitting element 116 to the measurement object 132.

In a generating step 166 according to step c), the first detector signal is generated by the photosensitive detector 120 upon receiving the first portion 128 of the optical radiation 112 which is directly guided from the optical element 124, especially the optical window 126, towards the photosensitive detector 120 to illuminate the photosensitive region 122, wherein the first detector signal is dependent on an illumination of the photosensitive region 122 by the first portion 128 of the optical radiation 112. In addition, the second detector signal may, according to step g), further be generated by using the photosensitive detector 120 upon receiving the second portion 130 of the optical radiation 112 which is indirectly guided from the optical element 124, especially the optical window 126, via the measurement object 132 towards the photosensitive detector 120 to, further, illuminate the photosensitive region 122, wherein the second detector signal is dependent on an illumination of the photosensitive region 122 by the second portion 130 of the optical radiation 112.

In an optional measuring step 168 according to step e), the measurement signal may, as particularly preferred, be generated by using the measurement unit 148 in a fashion that the measurement signal indicated whether the volume 146 in front of the photosensitive detector 120, especially within at least one predefined distance range from a surface of the housing 114 of the spectral sensing device 110, may be occupied or not.

In a calibrating step 170 according to step c), the calibration of the spectral sensing device 110 is performed by using the evaluation unit 140 taking into account the first detector signal as provided by the photosensitive detector 120. In a particularly preferred embodiment, the calibrating step 170 is only performed when the volume 146 in front of the photosensitive detector 120, especially within the at least one predefined distance range from the surface of the housing 114 of the spectral sensing device 110, may not occupied as confirmed during the measuring step 168, as schematically illustrated in FIG. 4. As a result of the calibrating step 170, at least one piece of calibration information 172 is obtained.

In an optional determining step 174, spectral information 176 related to the measurement object 132 may, further according to step g), be determined by using the second detector signal as generated by the photosensitive detector 120 during the generating step 166 and taking into account the at least one piece of calibration information 172 as obtained during the calibrating step 170.

For further details concerning the method 160 for measuring the optical radiation 112, reference may be made to the description of the spectral sensing device 110 as provided above.

LIST OF REFERENCE NUMBERS 110 spectral sensing device
112 (emitted) optical radiation
114 housing
116 radiation emitting element
118 semiconductor-based radiation source
120 photosensitive detector
122 photosensitive region
124 optical element
126 optical window
128 first portion
127 internal optical element
130 second portion
132 measurement object
134 optically transparent medium
136 spectral transfer element
138 optical filter
140 evaluation unit
142 interface
144 interface
146 volume
148 measurement unit
150 beam
152 interface
160 method for measuring optical radiation
162 emitting step
164 guiding step
166 generating step
168 measuring step
170 calibrating step
172 calibration information
174 determining step
176 spectral information

The invention claimed is:
1. A spectral sensing device for measuring optical radiation, comprising:
at least one photosensitive detector, wherein the at least one photosensitive detector has at least one photosensitive region designated for receiving optical radiation, wherein at least one detector signal as generated by the at least one photosensitive detector is dependent on an illumination of the at least one photosensitive region;
at least one radiation emitting element, wherein the at least one radiation emitting element is designated for emitting the optical radiation;
at least one optical element, wherein the at least one optical element is designated to guide a first portion of the optical radiation to the at least one photosensitive detector, wherein the at least one optical element is or comprises at least one beam splitter; and
at least one evaluation unit, wherein the at least one evaluation unit is configured to perform a calibration of the spectral sensing device by using at least one first detector signal as generated by the at least one photosensitive detector upon the illumination of the at least one photosensitive region by the first portion of the optical radiation, wherein the calibration refers to a process of correcting from time to time drifting effects occurring in the spectral sensing device, wherein the drifting effects are caused by alterations related to the spectral sensing device itself or having an effect onto the spectral sensing device.

2. The spectral sensing device according to claim 1, wherein a type of reflection of the first portion of the optical radiation at the at least one optical element to be guided to the at least one photosensitive detector is a Fresnel reflection.

3. The spectral sensing device according to claim 1, wherein the at least one optical element is assembled within the spectral sensing device.

4. The spectral sensing device according to claim 1, wherein at least one relationship between at least one optical property of the at least one optical element and at least one optical property of at least one external calibration target is known, wherein the at least one evaluation unit is configured to perform the calibration of the spectral sensing device by using the at least one relationship between the at least one optical property of the at least one optical element and the at least one optical property of the at least one external calibration target.

5. The spectral sensing device according to claim 1, wherein the at least one evaluation unit is configured to perform the calibration of the spectral sensing device by using the at least one first detector signal as generated by the at least one photosensitive detector upon the illumination of the at least one photosensitive region only by the first portion of the optical radiation.

6. The spectral sensing device according to claim 1, further comprising
at least one measurement unit, wherein the at least one measurement unit is designated for generating at least one measurement signal, wherein the at least one measurement signal is dependent on an occupation of a volume in front of the at least one photosensitive detector.

7. The spectral sensing device according to claim 6, wherein the at least one evaluation unit is configured to perform the calibration of the spectral sensing device by further using the at least one measurement signal as generated by the at least one measurement unit.

8. The spectral sensing device according to claim 7, wherein the at least one evaluation unit is configured to perform the calibration of the spectral sensing device only if the at least one measurement signal as generated by the at least one measurement unit indicates that the volume in front of the at least one photosensitive detector is not occupied.

9. The spectral sensing device according to claim 6, wherein the at least one measurement unit is or comprises at least one presence sensor, wherein the at least one presence sensor is selected from the group consisting of at least one of a proximity sensor and a distance sensor.

10. The spectral sensing device according to claim 6, wherein the at least one measurement unit is selected from the group consisting of at least one of an ultrasonic sensor, an optical sensor, an inductive sensor, a tactile sensor, a radar sensor, a time-of-flight sensor, a triangulation sensor, a stereo sensor, a structured light sensor, a capacitive sensor, a FIP sensor, and a BPA sensor.

11. The spectral sensing device according to claim 1, wherein the at least one optical element is further designated to guide a second portion of the optical radiation to at least one measurement object.

12. The spectral sensing device according to claim 11, wherein the at least one optical element is designated for at least one of reflecting the first portion of the optical radiation to the at least one photosensitive detector and transmitting the second portion of the optical radiation to the at least one measurement object, or
transmitting the first portion of the optical radiation to the at least one photosensitive detector and reflecting the second portion of the optical radiation to the at least one measurement object.

13. The spectral sensing device according to claim 1, wherein a ratio of the first portion of the optical radiation with respect to a second portion of the optical radiation depends on a relationship of a refractive index of the at least one optical element with respect to a refractive index of at least one optically transparent medium which is traversed by the optical radiation on a path from the at least one radiation emitting element to the at least one optical element.

14. The spectral sensing device according to claim 1, wherein the at least one optical element comprises at least one transparent material, and wherein the at least one transparent material is at least partially transparent in at least a partition of a wavelength range as covered by the optical radiation.

15. The spectral sensing device according to claim 11, wherein the at least one evaluation unit is further configured to determine spectral information related to the at least one measurement object by using at least one second detector signal as generated by the at least one photosensitive detector upon the illumination of the at least one photosensitive region by the second portion of the optical radiation and by taking into account at least one piece of calibration information as obtained during the calibration of the spectral sensing device.

16. A method for measuring optical radiation, the method comprising the following steps:
a) emitting optical radiation by using at least one radiation emitting element;
b) guiding a first portion of the optical radiation to at least one photosensitive detector by using at least one optical element, wherein the at least one optical element is or comprises at least one beam splitter;
c) generating at least one detector signal by using the at least one photosensitive detector, wherein the at least one photosensitive detector has at least one photosensitive region designated for receiving the optical radiation, wherein the at least one detector signal as generated by the at least one photosensitive detector is dependent on an illumination of the at least one photosensitive region; and
d) performing a calibration of a spectral sensing device by using at least one first detector signal as generated by the at least one photosensitive detector upon the illumination of the at least one photosensitive region by the first portion of the optical radiation by using at least one evaluation unit, wherein the calibration refers to a process of correcting from time to time drifting effects occurring in the spectral sensing device, wherein the drifting effects are caused by alterations related to the spectral sensing device itself or having an effect onto the spectral sensing device.

17. The method according to claim 16, the method further comprising the following step:
e) generating at least one measurement signal by using at least one measurement unit, wherein the at least one measurement signal is dependent on an occupation of a volume in front of the at least one photosensitive detector.

18. The method according to claim 16, the method further comprising the following steps:
- f) using at least one optical element to guide a second portion of the optical radiation to at least one measurement object; and
- g) determining spectral information related to the at least one measurement object by using at least one second detector signal as generated by the at least one photosensitive detector upon the illumination of the at least one photosensitive region by the second portion of the optical radiation and by taking into account at least one piece of calibration information as obtained during step d).

* * * * *